United States Patent
Fan et al.

(10) Patent No.: US 11,631,093 B2
(45) Date of Patent: Apr. 18, 2023

(54) FLEXIBLE BEHAVIORAL CHAIN FRAMEWORK FOR PERMISSION-BASED ENTERPRISE-FOCUSED BLOCKCHAIN APPLICATIONS

(71) Applicant: AT&T Intellectual Property I, L.P., Atlanta, GA (US)

(72) Inventors: James W. Fan, San Ramon, CA (US); Dan Celenti, Holmdel, NJ (US); Alireza Hooshiari, Alpharetta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/377,121

(22) Filed: Jul. 15, 2021

(65) Prior Publication Data
US 2021/0342863 A1    Nov. 4, 2021

Related U.S. Application Data

(63) Continuation of application No. 16/427,423, filed on May 31, 2019, now Pat. No. 11,068,915.

(51) Int. Cl.
G06Q 30/02    (2012.01)
H04L 9/06    (2006.01)
G06Q 30/0201    (2023.01)

(52) U.S. Cl.
CPC ..... *G06Q 30/0201* (2013.01); *G06Q 30/0281* (2013.01); *H04L 9/0637* (2013.01)

(58) Field of Classification Search
CPC ............ G06Q 30/0201; G06Q 30/0281; H04L 9/0637
See application file for complete search history.

(56) References Cited

U.S. PATENT DOCUMENTS 9,882,918 B1    1/2018 Ford
2017/0048235 A1    2/2017 Lohe
(Continued)

FOREIGN PATENT DOCUMENTS

KR    20200070986 A  *  6/2020

OTHER PUBLICATIONS

Roy "What is Customer Lifetime Value (CLV)? Definition, Calculation, Model, Benchmarks, and Examples" (2020) (https://www.spiceworks.com/marketing/customer-experience/articles/what-is-customer-lifetime-value-clv/) (Year: 2020).*

(Continued)

*Primary Examiner* — Sujay Koneru
(74) *Attorney, Agent, or Firm* — Hartman & Citrin LLC

(57) ABSTRACT

Concepts and technologies disclosed herein are directed to a flexible behavioral chain ("FBC") framework for permission-based enterprise-focused blockchain applications. According to one aspect disclosed herein, a chain framework module ("CFM") executed by a FBC system can receive a new block request to add a new block to an FBC. The new block request can be created by a trigger management module ("TMM") executed by the FBC system in response to a trigger, such as a customer touchpoint, a customer engagement, a subscribed event, and/or a virtual event. In response to the new block request, the CFM can generate the new block. A customer value score derivation module ("CVSDM") executed by the FBC system can determine a customer value score ("CVS") for a customer. The CFM can incorporate the CVS into the new block. The CFM can connect the new block to the FBC.

20 Claims, 12 Drawing Sheets

(56) References Cited

U.S. PATENT DOCUMENTS

| | | | |
|---|---|---|---|
| 2018/0000367 A1 | 1/2018 | Longinotti-Buitoni | |
| 2018/0117446 A1 | 5/2018 | Tran | |
| 2018/0225717 A1 | 8/2018 | Storti | |
| 2018/0268382 A1* | 9/2018 | Wasserman | G06Q 20/223 |
| 2018/0285810 A1* | 10/2018 | Ramachandran | G06Q 10/087 |
| 2018/0294966 A1 | 10/2018 | Hyun | |
| 2018/0359089 A1 | 12/2018 | Innes | |
| 2019/0068619 A1 | 2/2019 | Fan | |
| 2019/0108543 A1 | 4/2019 | Chan | |
| 2019/0130453 A1* | 5/2019 | Sasapu | G06Q 30/0631 |
| 2019/0156363 A1* | 5/2019 | Postrel | H04L 67/04 |
| 2019/0229919 A1 | 7/2019 | Gurkan | |
| 2019/0311392 A1 | 10/2019 | Swamidurai | |
| 2019/0362389 A1* | 11/2019 | Turner | G06Q 20/0655 |
| 2019/0378139 A1 | 12/2019 | Stribady | |
| 2020/0021569 A1 | 1/2020 | Simons | |
| 2020/0134660 A1 | 4/2020 | Kadaster | |
| 2020/0136805 A1* | 4/2020 | Clawson | H04L 9/0637 |
| 2020/0210925 A1 | 7/2020 | Kuznetcov | |
| 2020/0211007 A1 | 7/2020 | Li | |
| 2020/0211024 A1 | 7/2020 | Li | |
| 2020/0349284 A1 | 11/2020 | Saket | |
| 2020/0406859 A1 | 12/2020 | Hassani | |

OTHER PUBLICATIONS

U.S. Office Action dated Oct. 29, 2020 in U.S. Appl. No. 16/427,423.
U.S. Notice of Allowance dated Mar. 2, 2021 in U.S. Appl. No. 16/427,423.

\* cited by examiner

FLEXIBLE BEHAVIORAL CHAIN FRAMEWORK FOR PERMISSION-BASED ENTERPRISE-FOCUSED BLOCKCHAIN APPLICATIONS

CROSS-REFERENCE TO RELATED APPLICATIONS

This application is a continuation of and claims priority to U.S. patent application Ser. No. 16/427,423, entitled "Flexible Behavioral Chain Framework for Permission-Based Enterprise-Focused Blockchain Applications," filed May 31, 2019, now U.S. Pat. No. 11,068,915, which is incorporated herein by reference in its entirety.

BACKGROUND

A customer journey is the set of interactions between a customer and an enterprise. Enterprises often track and store customer journey data and perform various analytics on this data to gain insights into customer behavior. These insights allow enterprises to better understand their customers and to make more informed business decisions to improve customer relationships, reach revenue goals, and meet other goals.

Enterprises often store customer journey data in different silo databases/systems. The customer journey data may be fed, at least in part, to a data warehouse or big data infrastructure for analytics to drive insights. The customer journey data is normalized over time and the raw data is then archived. A problem with this approach is the source of truth about customer journeys may never be able to be fully recovered or re-created. Today's business needs have led to an increased demand for customer journey data to be stored in a distributed manner, with an emphasis on security and the ability to backtrack analytics or aggregation results to a customer's original, unaltered raw data.

Blockchain is emerging as a preeminent decentralized ledger and is receiving increasing attention from researchers, practitioners, organizations, and the public. Initially, blockchain was developed to address the "double spending" problem in cryptocurrencies, but recently, many new applications of blockchain have been proposed or are being developed. Blockchain allows sharing data in a decentralized, transparent and immutable way, using a peer-to-peer network, without the need to trust any particular entity.

Blockchain is receiving growing attention not just as the underlying technology of cryptocurrencies, but also as a public ledger in various domains. Financial institutions, for example, are examining the use of blockchain as a ledger for financial transactions to cut out the middleman to reduce costs and to expedite processing transactions. Blockchain also can be used to maintain digital assets, such as stocks, bonds, land titles, and the like. Stored transactions record the transfer of assets between users. Blockchain can store data and documents, either in full or merely as a digest of the data (e.g., a cryptographic hash like SHA-256) to provide evidence of the existence of data or documents, such as contracts, patents, scientific publications, deeds, insurance policies, and the like. Blockchain also can be used for identity management through hashed features of a person (e.g., verifiable attributes of the person) stored with a public key or some other means to electronically sign documents, or access remote services to protect people from identity theft and fraudulent impersonation. Blockchain has the potential to provide a secure infrastructure for smart cities and could facilitate the creation of a marketplace of social data where people share their private data for public benefit. Blockchain also has commercial uses, such as for tracking diamonds from mines to market, managing data provenance in Internet of Things ("IoT") systems, providing transparency in product manufacturing and supply chain management, and supporting vehicle provenance.

SUMMARY

Concepts and technologies disclosed herein are directed to aspects of a flexible behavioral chain ("FBC") framework for permission-based enterprise-focused blockchain applications. According to some aspects of the concepts and technologies disclosed herein, a chain framework module ("CFM") of an FBC system can receive a new block request to add a new block to an FBC. In response to the new block request, the CFM can generate the new block. In some embodiments, in response to the new block request, the CFM can perform a validation to determine whether the new block request is valid prior to generating the new block. A customer value score derivation module ("CVSDM") of the FBC system can determine a customer value score ("CVS") for a customer. The CFM can incorporate the CVS into the new block. The CFM can connect the new block to the FBC.

In some embodiments, a trigger management module ("TMM") of the FBC system can receive a trigger. In some embodiments, the trigger can be or can include a subscribed event. In some embodiments, the trigger can be or can include a customer touchpoint. In some embodiments, the trigger can be or can include a customer engagement. In some embodiments, the trigger can include a virtual event. In response to the trigger, the TMM can generate the new block request to add the new block to the FBC. The TMM can send the new block request to the CFM.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein provide a flexible behavioral chain ("FBC") framework for permission-based enterprise-focused blockchain applications. Current blockchain architecture can be leveraged to support customer journey interaction points. A customer journey is the set of interactions between a customer and an enterprise. Enterprises often track and store customer journey data and perform various analytics on this data to gain insights into customer behavior. These insights allow enterprises to better understand their customers and to make more informed business decisions to improve customer relationships, reach revenue goals, and meet other goals. An enterprise may want to have a standardized method to assign an enterprise value to a customer to differentiate among customers and to provide differentiated treatment. The concept of this enterprise value is described herein as a customer value score ("CVS"). The higher the CVS, the higher the customer's relative value is to the enterprise.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
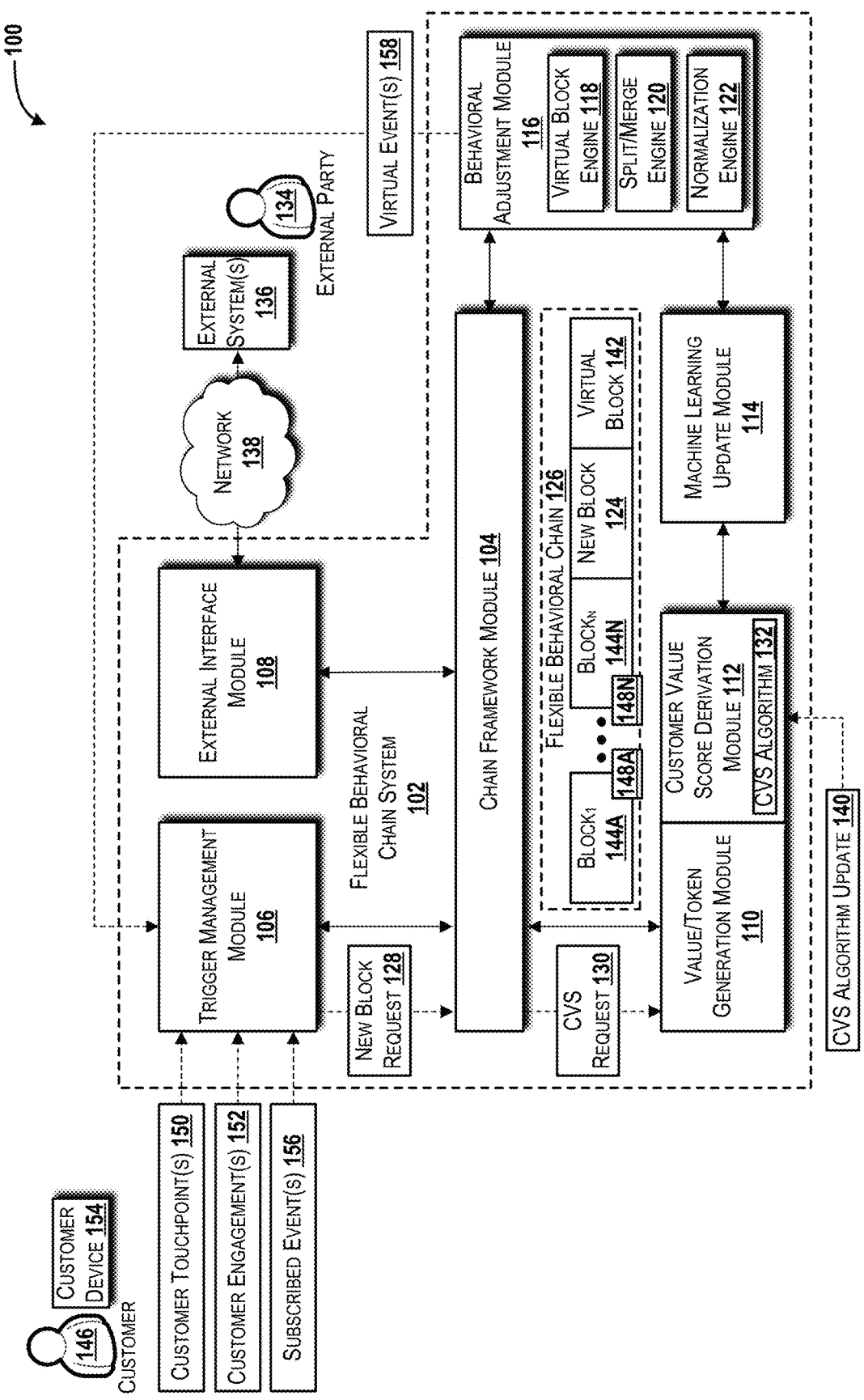
FIG. 1 is a block diagram illustrating aspects of an illustrative operating environment for various concepts and technologies disclosed herein.

Turning now to FIG. 1, an operating environment 100 in which embodiments of the concepts and technologies disclosed herein will be described. The illustrated operating environment 100 includes an FBC system 102 that includes a chain framework module ("CFM") 104, a trigger management module ("TMM") 106, an external interface module ("EIM") 108, and a value/token generation module ("VTGM") 110. In addition, the FBC system 102 includes three modules that enable further flexibility for consideration of certain enterprise requirements. In particular, the illustrated FBC 102 includes a customer value score derivation module ("CVSDM") 112, a machine learning update module ("MLUM") 114, and a behavioral adjustment module ("BAM") 116. The illustrated BAM 116, in turn, includes a virtual block engine ("VBE") 118, a split/merge engine ("SME") 120, and a normalization engine ("NE") 122. The CVSDM 112, the MLUM 114, and the BAM 116 can be in communication with the TMM 106, the EIM 108, the CFM 104, and the VTGM 110 to perform various operations described herein. While connections are not shown between some components illustrated in FIG. 1, it should be understood that some, none, or all of the components illustrated in FIG. 1 can be configured to interact with one other to carry out various operations described herein.

In accordance with the concepts and technologies disclosed herein, for each trigger point in a customer's journey, attributes associated with the trigger point and a CVS can be added to a newly-generated block ("new block") 124 in an FBC 126. This is handled by the TMM 106. The TMM 106 can invoke an application programming interface ("API") call or otherwise instruct the CFM 104 to create the new block 124 responsive to the trigger point. The CFM 104 can perform a validation process to determine whether a new block request 128 is valid to add the new block 124 to the FBC 126. The validation process can be used to validate that the requestor is authorized. The validation process can be used to validate that a requested block is allowed in the FBC 126 based upon one or more policies. The validation process can be used to validate if the new block request 128 is a duplicate request or otherwise in conflict with another pending request. If the CFM 104 determines that the new block request 128 is valid, the CFM 104 can generate the new block 124 and attach the new block 124 to the FBC 126. Metadata, such as the date and time when the new block 124 was created, can be appended to the new block 124. In addition, the CFM 104 can generate a CVS request 130 directed to the VTGM 110/CVSDM 112, which can calculate the CVS based upon one or more CVS algorithms 132. The CFM 104 can incorporate, into the new block 124, the CVS, security token (if used), and other credentials (if applicable), in addition to pointers to any data sources, and/or a summary of all related data, and can connect the new block 124 to the FBC 126. This process can repeat in response to each new trigger. In addition to the TMM 106, the EIM 108 can provide a management interface for one or more authorized external parties 134 to access, via one or more external systems 136 over a network 138, block information to satisfy enterprise transactions (e.g., customer care agents can use the EIM to view the history of a customer's journey, etc.).

The CVSDM 112 is an adjunct module to the VTGM 110. The CVSDM 112 allows one or more CVS algorithms 132 to be added, removed, or modified via one or more CVS algorithm updates 140 to support the needs of different enterprises. The MLUM 114 provides a set of machine learning models that can be used to modify configuration parameters of the CVSDM 112 and/or the BAM 116. In this manner, the MLUM 114 continuously learns and uses learned information to optimize the CVSDM 112 and/or the BAM 116 to achieve specific objectives specified by the enterprise.

The BAM 116 provides powerful behavior adjustment capabilities to the FBC system 102 that can drastically improve the usefulness of the FBC architecture in an enterprise. The illustrated BAM 116 supports the VBE 118, the SME 120, and the NE 122. It should be understood, however, that additional capabilities can be added to the BAM 116 based upon the needs of an enterprise for a particular application. The VBE 118, the SME 120, and the NE 122 all act as special-purpose change agents to change the behavior of the FBC 126.

The VBE 118 can dynamically add an internally-generated virtual block ("virtual block") 142 to existing blocks ("blocks") 144A-144N in the FBC 126. The virtual block 142 enables the FBC 126 to temporarily or permanently decrease or increase the CVS associated with a customer 146. If the CVS is to be adjusted temporarily, the virtual block 142 can be associated with a timer that inactivates the virtual block 142 upon expiration.

The SME 120 can automatically or manually determine if the FBC 126 should be split. If the FBC 126 is split, the FBC 126 may or may not be merged back. Two or more sub-chains of the FBC 126 can be merged back into a single chain.

The NE 122 adds an analytic trigger probe ("probe") 148A-148N to each of the blocks 144A-144N, respectively. When the CVS(s) associated with one or more of the blocks 144A-144N is/are to be adjusted, the NE 122 can support real-time normalization of the CVS(s) based upon the behavior of one or more other FBCs (best shown in FIG. 6B). Normalization can be handled via one or more virtual blocks, such as the virtual block 142, which is used to record any updates used to normalize the FBC 126. In some cases, the virtual block 142 designed for normalization is not added to the FBC 126. In such cases, a virtual tag (not shown) can be added to one or more of the blocks 144A-144N to indicate the CVS before and after normalization. In this manner, the FBC 126 can maintain a history after the normalization process. The normalization process also can be performed in non-real-time if the enterprise decides to actively trigger a normalization event based upon a change to enterprise needs.

In the illustrated embodiment, the customer 146 can be associated with one or more customer touchpoints ("touchpoint(s)") 150 and one or more customer engagements ("engagement") 152. The touchpoint(s) 150 can be representative of when the customer 146 interacts with an enterprise. Some examples of the touchpoint(s) 150 include, but are not limited to: an interaction between the customer 146 and an enterprise during which the customer 146 purchases or removes a service, service feature, or service feature package; an interaction between the customer 146 and an enterprise during which the customer 146 requests troubleshooting guidance; an interaction between the customer 146 and an enterprise during which the customer 146 requests a billing adjustment; and the like. The interaction between the customer 146 and the enterprise can be an in-person interaction, a telephone-based interaction, an email-based interaction, a messaging-based interaction, a chat-based interaction, a web-based interaction, combinations thereof, and the like. The engagement(s) 152 can be representative of when the customer 146 engages with a service provided by an enterprise, such as via a customer device 154. Some examples of the engagement(s) 152 include, but are not limited to: an interaction during which the customer 146 invokes a specific service; an interaction during which the customer 146 orders a video-on-demand; an interaction during which the customer 146 streams audio and/or video; an interaction during which the customer 146 streams a video game; and the like.

The functionality of the customer device 154 can be provided by one or more mobile telephones, smartphones, tablet computers, slate computers, smart watches, smart glasses, other wearable devices, other smart devices, Internet of Things ("IoT") devices, security devices, media playback devices, video game systems, navigation devices, connected cars, infotainment systems, laptop computers, notebook computers, ultrabook computers, netbook computers, computers of other form factors, computing devices of other form factors, other computing systems, other computing devices, and/or the like. It should be understood that the functionality of each of the customer device 154 can be provided by a single device, by two or more similar devices, and/or by two or more dissimilar devices. An example architecture that can be utilized by the customer device 154 in context of a mobile telephone or smartphone is illustrated and described herein with reference to FIG. 9.

In addition to the touchpoints 150 and the engagements 152, two new special types of triggers can be used to cause the CFM 104 to add the virtual block 142 to the FBC 126 on behalf of the customer 146. In particular, one or more subscribed events 156 can be evaluated to determine whether a behavioral block should be added in conjunction with a regular block, collectively new blocks 124. One or more internally-created virtual events ("virtual event(s)") 158 can be initiated by the BAM 116 to prompt creation of the virtual block(s) 142 to be added to the FBC 126.

The behavior of the FBC 126 can be dynamically changed based on new enterprise requirements, rules, and/or other factors. When a change to the FBC 126 is desired by the enterprise, the virtual block 142 is created and added to the FBC 126. The virtual block 142 allows the FBC 126 to increase or decrease the current CVS, to split one or more of the blocks 144 into one or more sub-chains, to merge multiple sub-chains into a single chain, and to enable CVS normalization across multiple related chains.

Three example use cases for the FBC 126 will now be described. These use cases are provided as exemplary examples of some scenarios to which the concepts and technologies disclosed herein can be applied. As such, the use cases described below should not be construed as being limiting in any way. In one use case, the virtual block 142 is to be added to the FBC 126 to support a special business event. For example, the customer 146 might be a customer of a streaming service, but the customer 146 might rarely use the streaming service. The customer 146 might have a CVS of 300, which is at the low end of the average CVS of 500 for this particular service. The customer 146 might decide to stream a popular sporting event, such as the Super Bowl, but since the customer 146 rarely utilizes the streaming service, the low CVS of the customer 146 and the crowded network traffic during the event might cause the streaming request to be rejected or accepted and provided at a less desirable Quality of Experience ("QoE"). In an effort to convert the customer 146 from a one-time user of the streaming service into a more frequent user, the BAM 116, via the VBE 118, can generate the virtual event 158, which can be received by the TMM 106 and used to trigger the new block request 128 directed to the CFM 104, which, in response, establishes the virtual block(s) 142 to be added to the FBC 126 to temporarily increase the CVS of the customer 146 so that the customer 146 can receive a better QoE for streaming the Super Bowl. After a pre-determined time period, if the customer 146 never invokes the streaming service again, another virtual event 158 can be used to trigger creation of another virtual block 142 to be added to the FBC 126 to reduce the CVS of the customer 146 back to the original value (i.e., CVS of 300).

In another use case, the virtual block 142 can be used to split or merge the FBC 126. For example, assuming the FBC 126 has been established for the customer 146, and assuming a television service provider decides to launch a promotional product that offers 1000 channels in a given market segment to gather data to decide whether to expand the promotional product to other market segments, only the FBCs 126 of the customer 146 and other customers (not shown) in the given market segment should be adjusted. As such, the BAM 116, via the VBE 118, can generate the virtual event 158, which can be received by the TMM 106 and used to trigger the new block request 128 directed to the CFM 104, which, in response, creates the virtual block 142 to split the FBC 126 into two sub-chains for the customer 146. When the market trial ends, another virtual event 158 can be used to trigger creation of another virtual block 142 to merge the two sub-chains back into one chain. It should be noted that, in some situations, a merge may not be needed depending upon business requirements.

In yet another use case, the virtual block 142 can be used to normalize the CVSs for a group of customers. For example, assuming over a specific period of time that most customers have a CVS of 500 or above, it becomes difficult for the service provider to differentiate the true value of their customers. A normalization process can be triggered by the normalization engine 122 to add the virtual blocks 124 to adjust/normalize the CVS for this group of customers.

Figure 2:
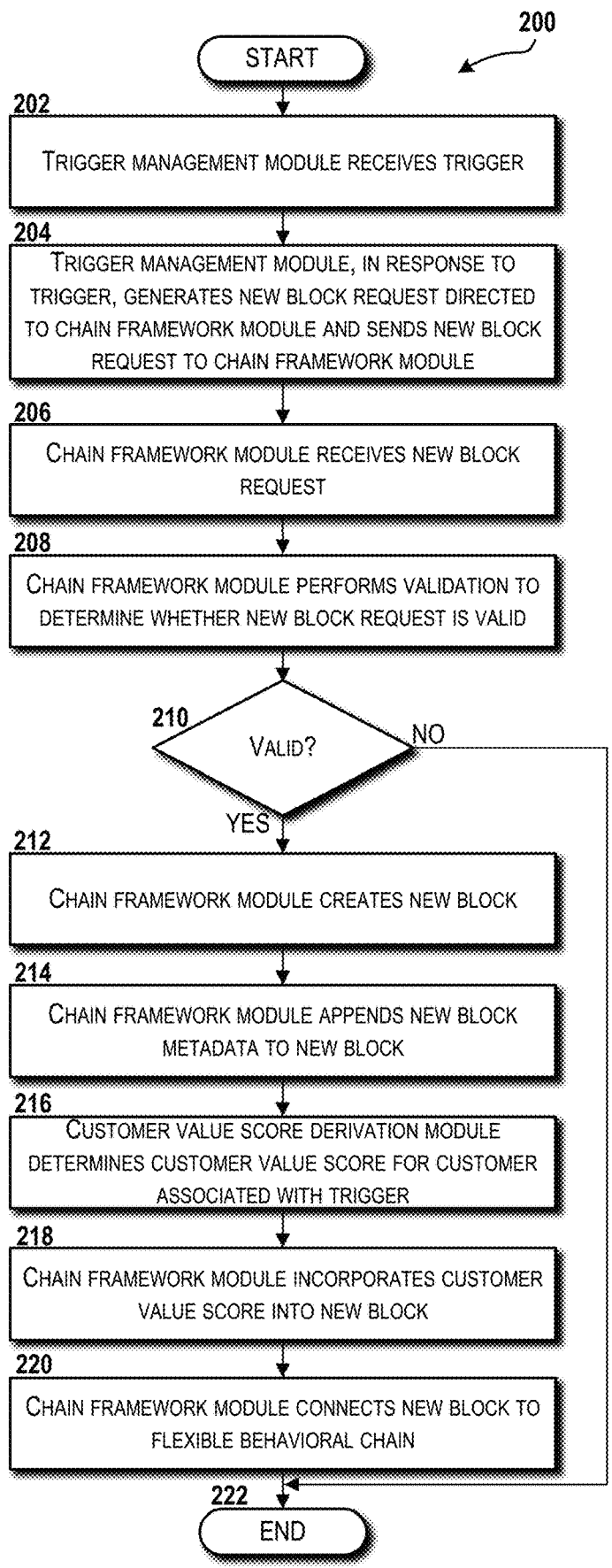
FIG. 2 is a flow diagram illustrating aspects of a method for adding a new block to a flexible behavioral chain, according to an illustrative embodiment of the concepts and technologies disclosed herein.

Turning now to FIG. 2, a flow diagram illustrating aspects of a method 200 for adding the new block 124 to the FBC 126, according to an illustrative embodiment of the concepts and technologies disclosed herein. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, the FBC system 102 or a portion thereof, to perform one or more operations, and/or causing the processor to direct other components of the computing system or device to perform one or more of the operations.

For purposes of illustrating and describing the concepts of the present disclosure, operations of the methods disclosed herein are described as being performed by alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins and proceeds to operation 202, where the TMM 106 receives a trigger responsive to the customer touchpoint(s) 150, the customer engagement(s) 152, the subscriber event(s) 156, and/or the virtual event(s) 158. From operation 202, the method 200 proceeds to operation 204, where the TMM 106, in response to the trigger, generates the new block request 128 and sends the new block request 128 to the CFM 104. From operation 204, the method 200 proceeds to operation 206, where the CFM 104 receives the new block request 128.

From operation 206, the method 200 proceeds to operation 208, where the CFM 104 performs a validation process to determine whether the new block request 128 is valid. The validation process can be used to validate that the requestor is authorized. The validation process can be used to validate that a requested block is allowed in the FBC 126 based upon one or more policies. The validation process can be used to validate if the new block request 128 is a duplicate request or otherwise in conflict with another pending request. From operation 208, the method 200 proceeds to operation 210, wherein the CFM 104 determines, based upon the validation process, if the new block request 128 is valid. If the CFM 104 determines, at operation 210, that the new block request 128 is valid, the method 200 proceeds to operation 212, where the CFM 104 creates the new block 124 in accordance with the new block request 128. From operation 212, the method 200 proceeds to operation 214, where the CFM 104 appends new block metadata, such as the date and time when the new block 124 was created, to the new block 124.

From operation 214, the method 200 proceeds to operation 216, where the CVSDM 112 determines a CVS for the customer 146 associated with the trigger received at operation 202. From operation 216, the method 200 proceeds to operation 218, where the CFM 104 incorporates the CVS into the new block 124. From operation 218, the method 200 proceeds to operation 220, where the CFM 104 connects the new block 124 to the FBC 126. From operation 220, the method 200 proceeds to operation 222, where the method 200 ends. The method 200 also ends if the CFM 104 determines, at operation 210, that the new block request 128 is invalid.

Figure 3:
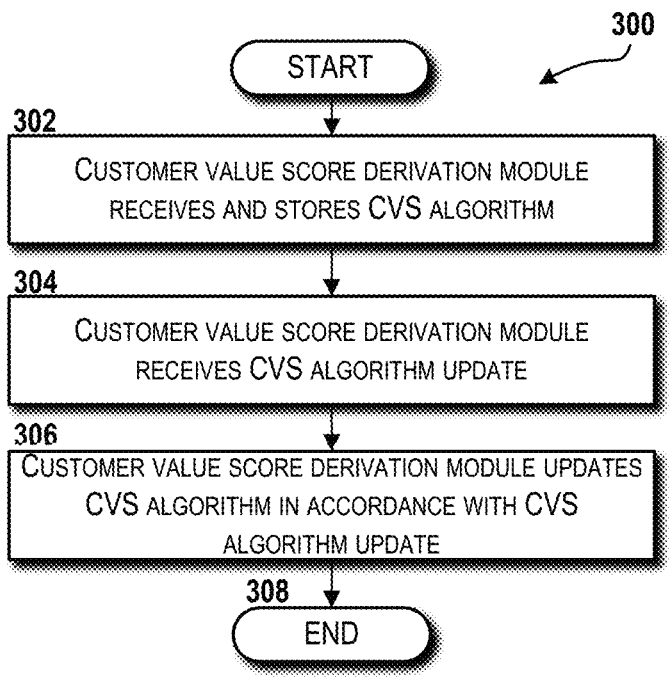
FIG. 3 is a flow diagram illustrating aspects of a method for updating a customer value score algorithm, according to an illustrative embodiment of the concepts and technologies disclosed herein.

Turning now to FIG. 3, a method 300 for updating the CVS algorithm 132 will be described according to an illustrative embodiment. The method 300 begins and proceeds to operation 302, where the CVSDM 112 receives and stores the CVS algorithm 132 to be used to calculate CVSs for customers such as the customer 146. From operation 302, the method 300 proceeds to operation 304, where the CVSDM 112 receives the CVS algorithm update 140. The CVS algorithm update 140 can include a new CVS algorithm that can be added to the CVSDM 112 or that can replace the CVS algorithm 132. The CVS algorithm update 140 alternatively can modify the CVS algorithm 132 to support the changing needs of a given enterprise. The CVS algorithm update 140 can be manually created by an enterprise representative. Alternatively, the CVS algorithm update 140 can be created in response to output from the MLUM 114, as described in greater detail below, and in this manner, the CVS algorithm update 140 can be created automatically. From operation 304, the method 300 proceeds to operation 306, where the CVSDM 112 updates the CVS algorithm 132 in accordance with the CVS algorithm update 140. From operation 306, the method 300 proceeds to operation 308, where the method 300 ends.

Figure 4A:
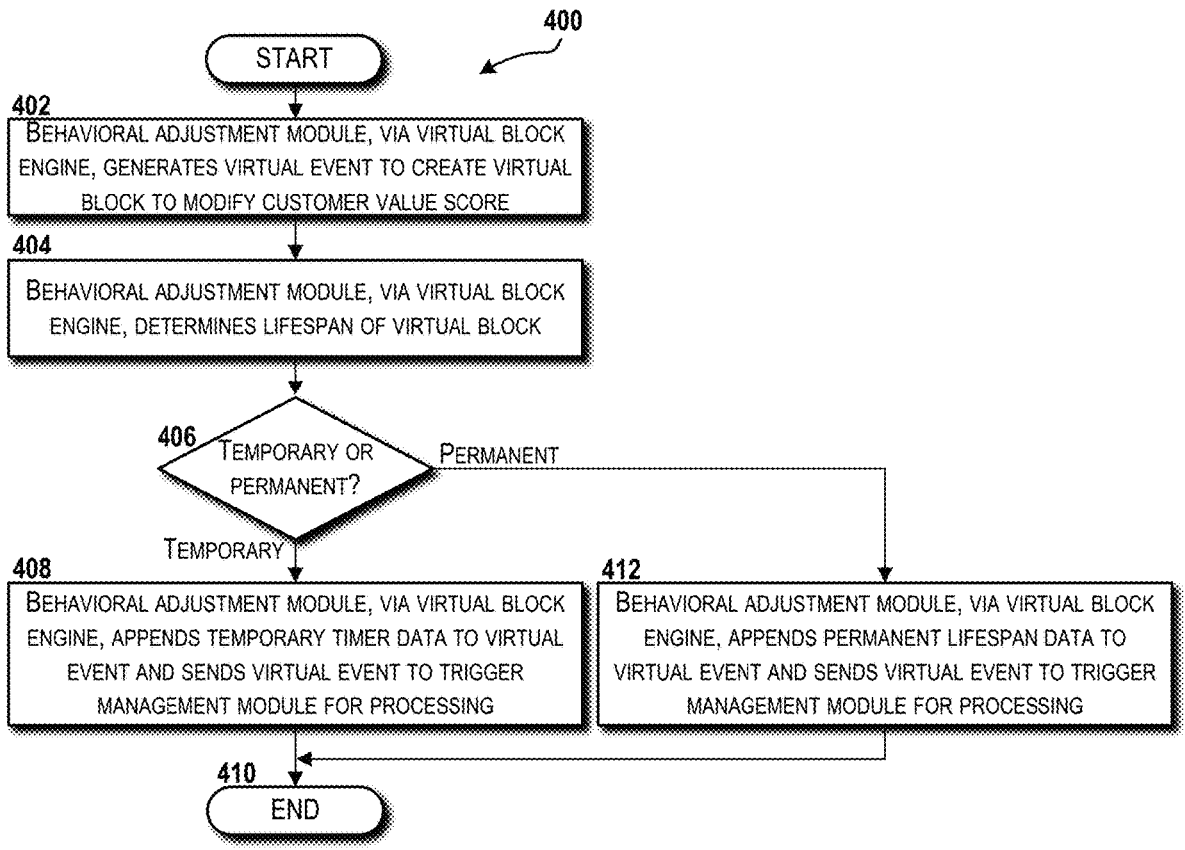
FIG. 4A is a flow diagram illustrating aspects of a method for adding a virtual block to a flexible behavioral chain, according to an illustrative embodiment of the concepts and technologies disclosed herein.

Turning now to FIG. 4A, a method 400 for adding the virtual block 142 to the FBC 126 will be described, according to an illustrative embodiment. The method 400 will be described with reference to FIG. 4 and further reference to FIG. 1. The method 400 begins and proceeds to operation 402, where the BAM 116, via the VBE 118, generates the virtual event 158 to create the virtual block 142 to modify the CVS associated with the customer 146. From operation 402, the method 400 proceeds to operation 404, where the BAM 116, via the VBE 118, determines a lifespan of the virtual block 142. In some embodiments, the virtual block 142 is used to apply a temporary adjustment to the CVS of the customer 146, such as to temporarily increase the CVS of the customer 146 so that the customer 146 can receive a better QoE for a streaming service in one of the example use cases described above. In some embodiments, the virtual block 142 is used to apply a permanent adjustment to the CVS of the customer 146, such as part of normalization process.

From operation 404, the method 400 proceeds to operation 406, where the BAM 116, via the VBE 118, determines if the lifespan of the virtual block 142 is to be temporary or permanent. If the BAM 116, via the VBE 118, determines the lifespan of the virtual block 142 is to be temporary, the method 400 proceeds to operation 408, where the BAM 116, via the VBE 118, appends temporary timer data to the virtual event 158 and sends the virtual event 158 to the TMM 106 for processing in accordance with the method 200 described above with reference to FIG. 2. In this instance, the new block 124 can be or can include the virtual block 142. From operation 408, the method 400 proceeds to operation 410, where the method 400 ends.

If the BAM 116, via the VBE 118, determines the lifespan of the virtual block 142 is to be permanent, the method 400 proceeds to operation 412, where the BAM 116, via the VBE 118, appends permanent lifespan data to the virtual event 158 and sends the virtual event 158 to the TMM 106 for processing in accordance with the method 200 described above with reference to FIG. 2. From operation 412, the method proceeds to operation 410, where the method 400 ends.

Figure 4B:
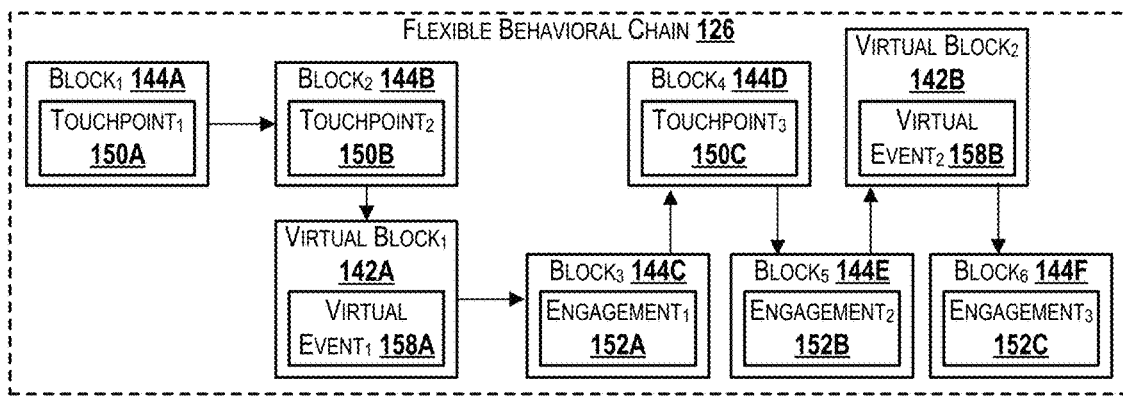
FIG. 4B is an example of a flexible behavioral chain to which virtual blocks have been added, according to an illustrative embodiment of the concepts and technologies disclosed herein.

Turning now to FIG. 4B, an example of the FBC 126 to which the virtual blocks 142 have been added will be described, according to an illustrative embodiment. The example of the FBC 126 shown in FIG. 4B can be illustrative of the use case described above in which the virtual blocks 142 are to be added to the FBC 126 to support a special business event. The illustrated example of the FBC 126 includes the blocks 144A-144F that, in turn, collectively include the touchpoints 150A-150C and the engagements 152A-152C, which can be indicative of various touchpoints 150 and engagements 152 associated with the customer 146. The configuration of the touchpoints 150 and the engagements 152 shown in FIG. 4B is just one exemplary configuration and should not be construed as being limiting in any way.

According to one of the use cases described above, the customer 146 might be a customer of a streaming service, but the customer 146 might rarely use the streaming service. The customer 146 might have a CVS of 300, which is at the low end of the average CVS of 500 for this particular service. The customer 146 might decide to stream a popular sporting event, such as the Super Bowl, but since the customer 146 rarely utilizes the streaming service, the low CVS of the customer 146 and the crowded network traffic during the event might cause the streaming request to be rejected or accepted and provided at a less desirable QoE. In an effort to convert the customer 146 from a one-time user of the streaming service into a more frequent user, the BAM 116, via the VBE 118, can generate the virtual event$_1$ 158A, which can be received by the TMM 106 and used to trigger the new block request 128 directed to the CFM 104, which, in response, establishes the virtual block$_1$ 142A to be added to the FBC 126 to temporarily increase the CVS of the customer 146 so that the customer 146 can receive a better QoE for streaming the Super Bowl. After a pre-determined time period, if the customer 146 never invokes the streaming service again, the virtual event$_2$ 158B can be used to trigger creation of the virtual block$_2$ 142B to be added to the FBC 126 to reduce the CVS of the customer 146 back to the original value (i.e., CVS of 300).

Figure 5A:
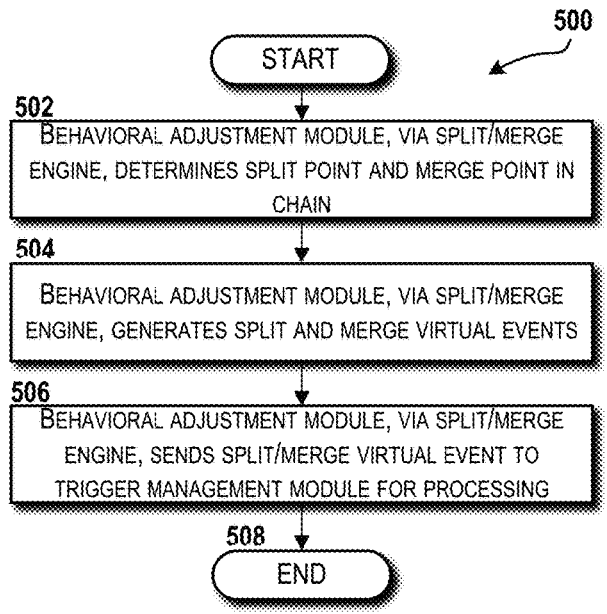
FIG. 5A is a flow diagram illustrating aspects of a method for splitting and merging a flexible behavioral chain, according to an illustrative embodiment of the concepts and technologies disclosed herein.

Turning now to FIG. 5A, a method 500 for splitting and merging one or more blocks 144 of the FBC 126 will be described, according to an illustrative embodiment of the concepts and technologies disclosed herein. The method 500 will be described with reference to FIG. 5A and further reference to FIG. 1. The method 500 begins and proceeds to operation 502, where the BAM 116, via the SME 120, determines a split point and a merge point in the FBC 126. The split point is where one or more of the blocks 144 will be split into two or more chains. The merge point is where two or more chains will be merged back into one chain. In some embodiments, a user interface can provide chain operations such as a chain split and a chain merge option. An entity (e.g., a customer service representative) can decide if a split is needed (e.g., if a new product trial is started). This split and merge also can be set in an automatic mode by business rules. For example, one rule may be for any new product introduction, and the associated chain will split automatically to capture this new interaction and merged automatically when the new product finishes the trial and enters a general rollout stage.

From operation 502, the method 500 proceeds to operation 504, where the BAM 116, via the SME 120, generates the virtual events 158 for the split point and the merge point. From operation 504, the method 500 proceeds to operation 506, where the BAM 116, via the SME 120 sends the virtual events 158 for the split point and the merge point to the TMM 106 for processing in accordance with the method 200 described above with reference to FIG. 2. From operation 506, the method proceeds to operation 508, where the method 500 ends.

Figure 5B:
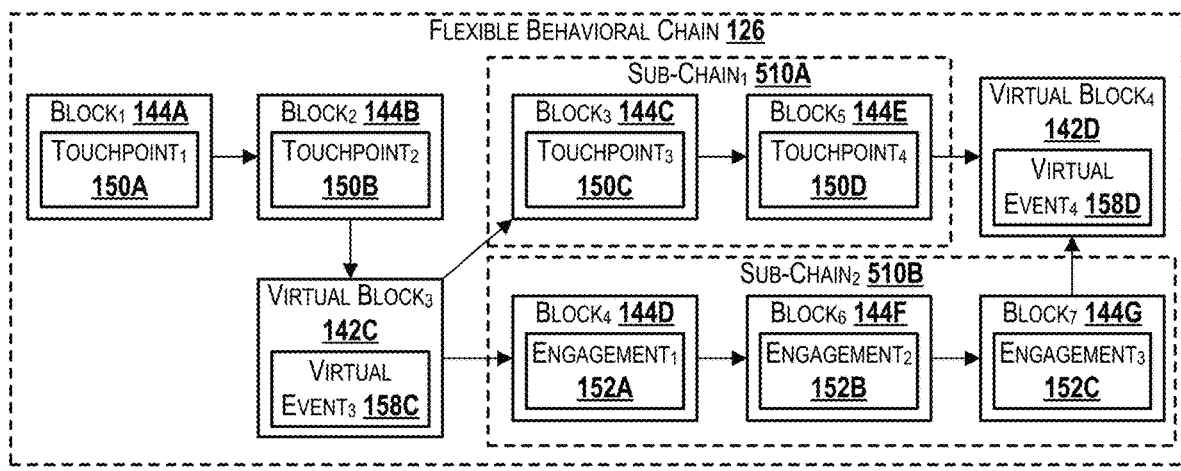
FIG. 5B is an example of a flexible behavioral chain that has been split and merged, according to an illustrative embodiment of the concepts and technologies disclosed herein.

Turning now to FIG. 5B, an example of the FBC 126 that has been split and merged will be described, according to an illustrative embodiment. The example of the FBC 126 shown in FIG. 5B can be illustrative of the use case described above in which the virtual blocks 142 are to be added to the FBC 126 to support a market study. The illustrated example of the FBC 126 includes the blocks 144A-144G that, in turn, collectively include the touchpoints 150A-150D and the engagements 152A-152C, which can be indicative of various touchpoints 150 and engagements 152 associated with the customer 146. The configuration of the touchpoints 150 and the engagements 152 shown in FIG. 5B is just one exemplary configuration and should not be construed as being limiting in any way.

According to another use case described above, the virtual $block_3$ 142C can be used to split the $block_2$ 144B into a first sub-chain ("$sub\text{-}chain_1$") 510A starting with the $block_3$ 144C and a second sub-chain ("$sub\text{-}chain_2$") 510B starting with the $block_4$ 144D. The virtual $block_4$ 142D can be used to merge the $sub\text{-}chain_1$ 510A and the $sub\text{-}chain_2$ 510B. Assuming the FBC 126 has been established for the customer 146, and assuming a television service provider decides to launch a promotional product that offers 1000 channels in a given market segment to gather data to decide whether to expand the promotional product to other market segments, only the FBCs 126 of the customer 146 and other customers (not shown) in the given market segment should be adjusted. As such, the BAM 116, via the VBE 118, can generate the $virtual\ event_3$ 158C, which can be received by the TMM 106 and used to trigger the new block request 128 directed to the CFM 104, which, in response, creates the $virtual\ block_3$ 142C to split the FBC 126 into the sub-chains 510A, 510B. When the market trial ends, the $virtual\ event_4$ 158D can be used to trigger creation of the virtual $block_4$ 142D to merge the two sub-chains 510A, 510B back into one chain. It should be noted that, in some situations, a merge may not be needed depending upon business requirements.

Figure 6A:
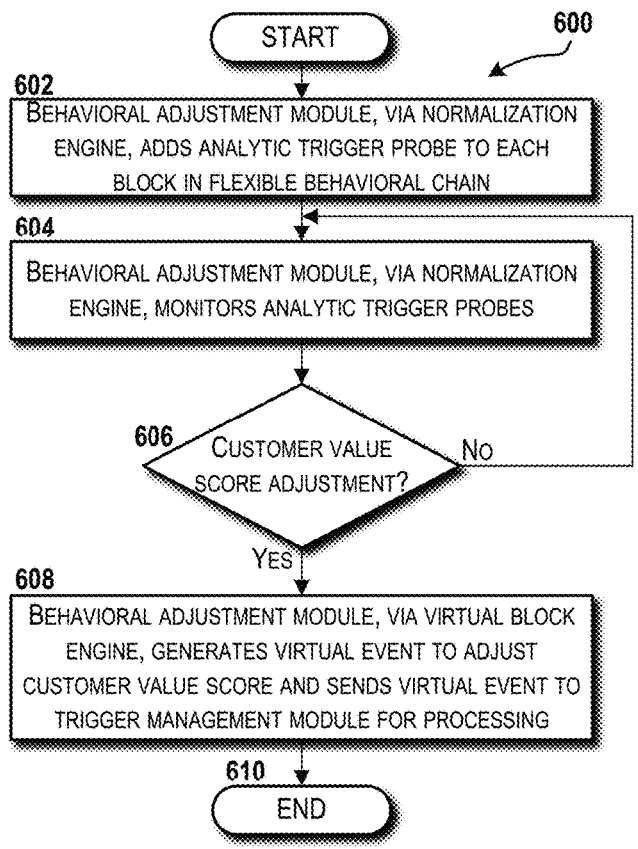
FIG. 6A is a flow diagram illustrating aspects of a method for normalizing a flexible behavioral chain, according to an illustrative embodiment of the concepts and technologies disclosed herein.

Turning now to FIG. 6A, a method 600 for normalizing the FBC 126 will be described, according to an illustrative embodiment of the concepts and technologies disclosed herein. The method 600 will be described with reference to FIG. 6A and further reference to FIG. 1. The method 600 begins and proceeds to operation 602, where the BAM 116, via the NE 122, adds the analytic trigger probes 148A-148N to the blocks 144A-144N in the FBC 126. From operation 602, the method 600 proceeds to operation 604, where the BAM 116, via the NE 122, monitors the analytic trigger probes 148A-148N for an indication that the CVS for the customer 146 should be adjusted. From operation 604, the method 600 proceeds to operation 606, where the BAM 116, via the NE 122, determines if the CVS for the customer 146 should be adjusted. If the BAM 116, via the NE 122, determines, at operation 606, that the CVS should not be adjusted, the method 600 returns to operation 604 and the BAM 116 continues to monitor the analytic trigger probes 148A-148N for an indication that the CVS for the customer 146 should be adjusted. If the BAM 116, via the NE 122, determines, at operation 606, that the CVS should be adjusted (i.e., the BAM 116 receives an indication that the CVS for the customer 146 should be adjusted), the method 600 proceeds to operation 608, where the BAM 116, via the VBE 118 generates the virtual event 158 to adjust the CVS and sends the virtual event 158 to the TMM 106 for processing in accordance with the method 200 described above with reference to FIG. 2. From operation 608, the method proceeds to operation 610, where the method 600 ends.

Figure 6B:
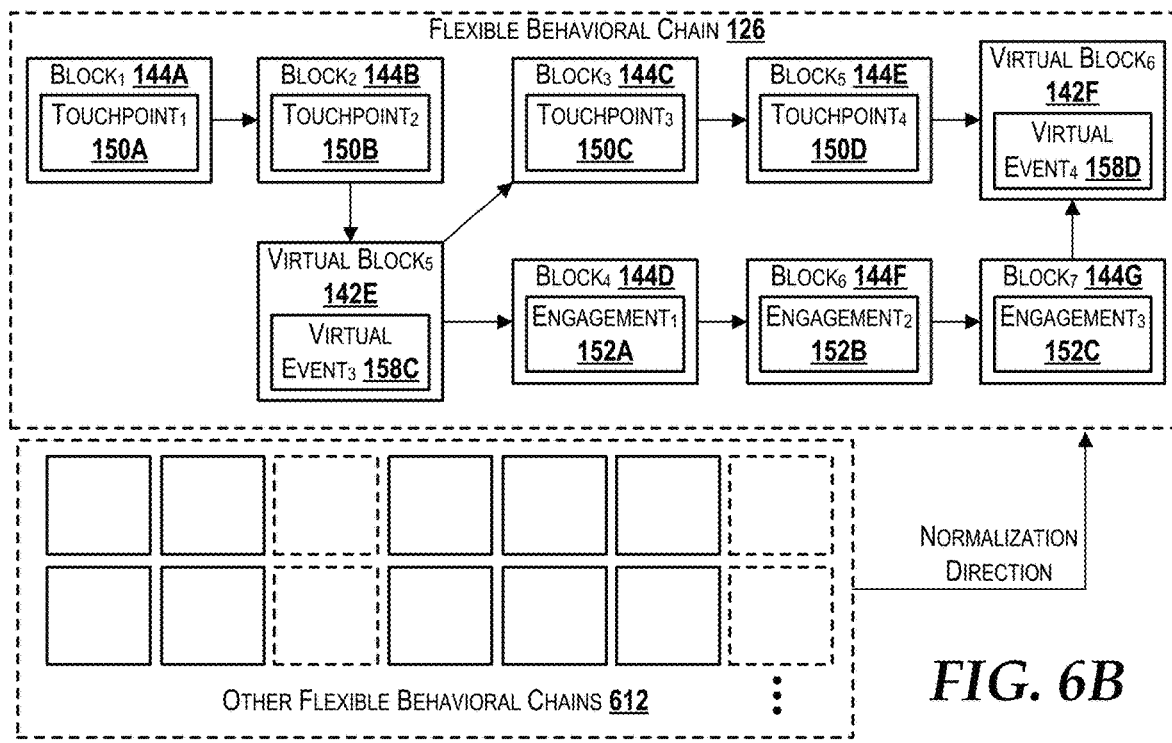
FIG. 6B is an example of a flexible behavioral chain that has been normalized with other flexible behavioral chains, according to an illustrative embodiment of the concepts and technologies disclosed herein.

Turning now to FIG. 6B, an example of the FBC 126 that has been normalized with other FBCs 612 will be described, according to an illustrative embodiment. The illustrated example of the FBC 126 includes the blocks 144A-144G that, in turn, collectively include the touchpoints 150A-150D and the engagements 152A-152C, which can be indicative of various touchpoints 150 and engagements 152 associated with the customer 146. The configuration of the touchpoints 150 and the engagements 152 shown in FIG. 5B is just one exemplary configuration and should not be construed as being limiting in any way.

According to a normalization use case, the virtual blocks 142E-142F can be used to normalize the CVSs for a group of customers represented by the other FBCs 612. For example, assuming over a specific period of time that most customers have a CVS of 500 or above, it becomes difficult for the service provider to differentiate the true value of their customers. A normalization process can be triggered by the NE 122 to add the virtual blocks 142E-142F to adjust/normalize the CVS for this group of customers. The normalization process can be triggered manually or automatically. In an automatic mode, an entity can establish a normalization rule set such as, for example, to trigger a CVS normalization whenever all scores in the chain exceed 300. Normalization can be initiated manually by an entity, such as an operation manager, for example.

Figure 7:
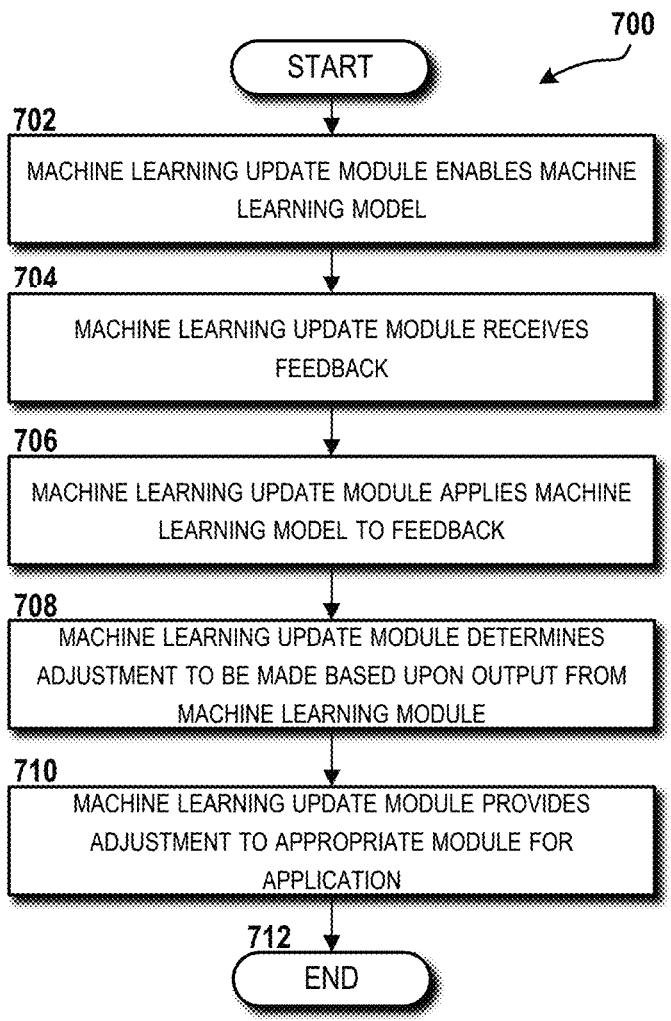
FIG. 7 is a flow diagram illustrating aspects of a method for implementing a machine learning update engine to adjust aspects of a flexible behavioral chain, according to an illustrative embodiment of the concepts and technologies disclosed herein.

Turning now to FIG. 7, a method 700 for implementing the MLUM 114 to adjust aspects of the FBC 126 will be described, according to an illustrative embodiment. The method 700 will be described with reference to FIG. 7 and further reference to FIG. 1. The method 700 begins and proceeds to operation 702, where the MLUM 114 enables one or more machine learning models. From operation 702, the method 700 proceeds to operation 704, where the MLUM 114 receives feedback from the BAM 116 and/or the CVSDM 112. From operation 704, the method 700 proceeds to operation 706, where the MLUM 114 applies the machine learning model(s) to the feedback. From operation 706, the method 700 proceeds to operation 708, where the MLUM 114 determines, based upon output from the machine learning model(s), one or more adjustments to be made to the FBC 126. From operation 708, the method 700 proceeds to operation 710, where the MLUM 114 provides the adjustment(s) to the appropriate module for application. For example, the MLUM 114 can instruct the VBE 118, the SME 120, and/or the NE 122 to apply the adjustment(s) to the FBC 126 via creation of the virtual events 158. From operation 710, the method 700 proceeds to operation 712, where the method 700 ends.

As an example implementation of machine learning for scoring, a percentage can be set for each parameter that contributes to an overall score calculation. Machine learning can be used to learn if the initial percentage for each parameter is too high or too low. In this case, the formula can be adjusted based upon the learned result. The same concept can apply to a behavior adjustment model. There are various business rules preset, such as the normalization rules and split and merge rules. Machine learning can contribute to the adjustments of each rule over time and the normalization and behavior models can be tailored to an optimal state.

Figure 8:
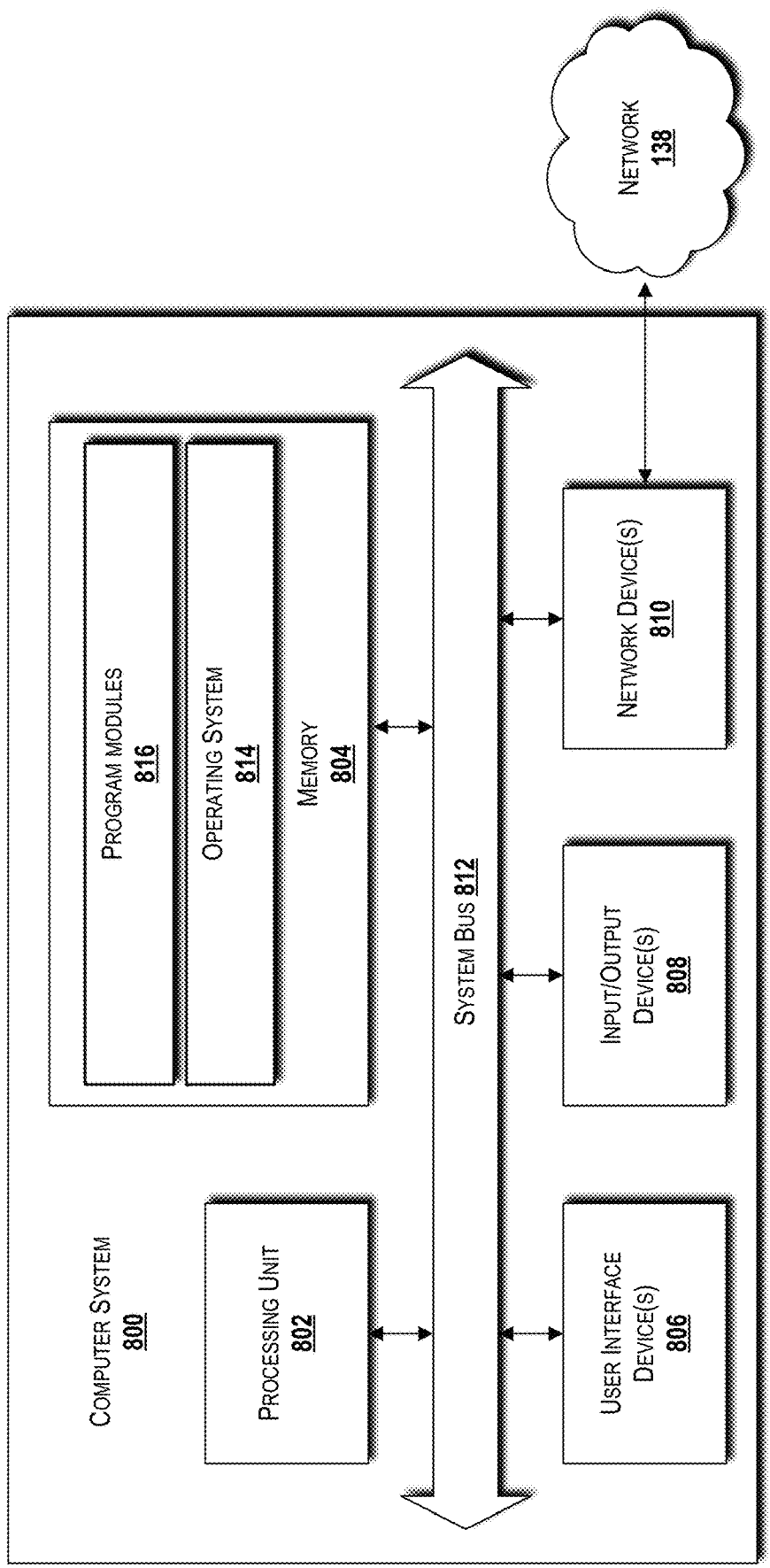
FIG. 8 is a block diagram illustrating an example computer system, according to some illustrative embodiments.

Turning now to FIG. 8, a block diagram illustrating a computer system 800 configured to provide the functionality described herein in accordance with various embodiments of the concepts and technologies disclosed herein. In some embodiments, the FBC system 102, the external system(s) 136, the customer device 154, and/or other systems disclosed herein can be configured like and/or can have an architecture similar or identical to the computer system 800 described herein with respect to FIG. 8. It should be understood, however, any of these systems, devices, or elements may or may not include the functionality described herein with reference to FIG. 8.

The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, or other type of processor known to those skilled in the art and suitable for controlling the operation of the computer system 800.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 816 may include various software and/or program modules described herein, such as the CFM 104, the TMM 106, the EIM 108, the VTGM 110, the CVSDM 112, the MLUM 114, and the BAM 116 (including the VBE 118, the SME 120, and/or the NE 122). By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium," "computer-readable storage medium," and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer to output data.

The network devices 810 enable the computer system 800 to communicate with other networks or remote systems via one or more networks, such as the network 138. Examples of the network devices 810 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such as a WiMAX network, or a cellular network. Alternatively, the network(s) may be a wired network such as, but not limited to, a WAN such as the Internet, a LAN, a wired PAN, or a wired MAN.

Figure 9:
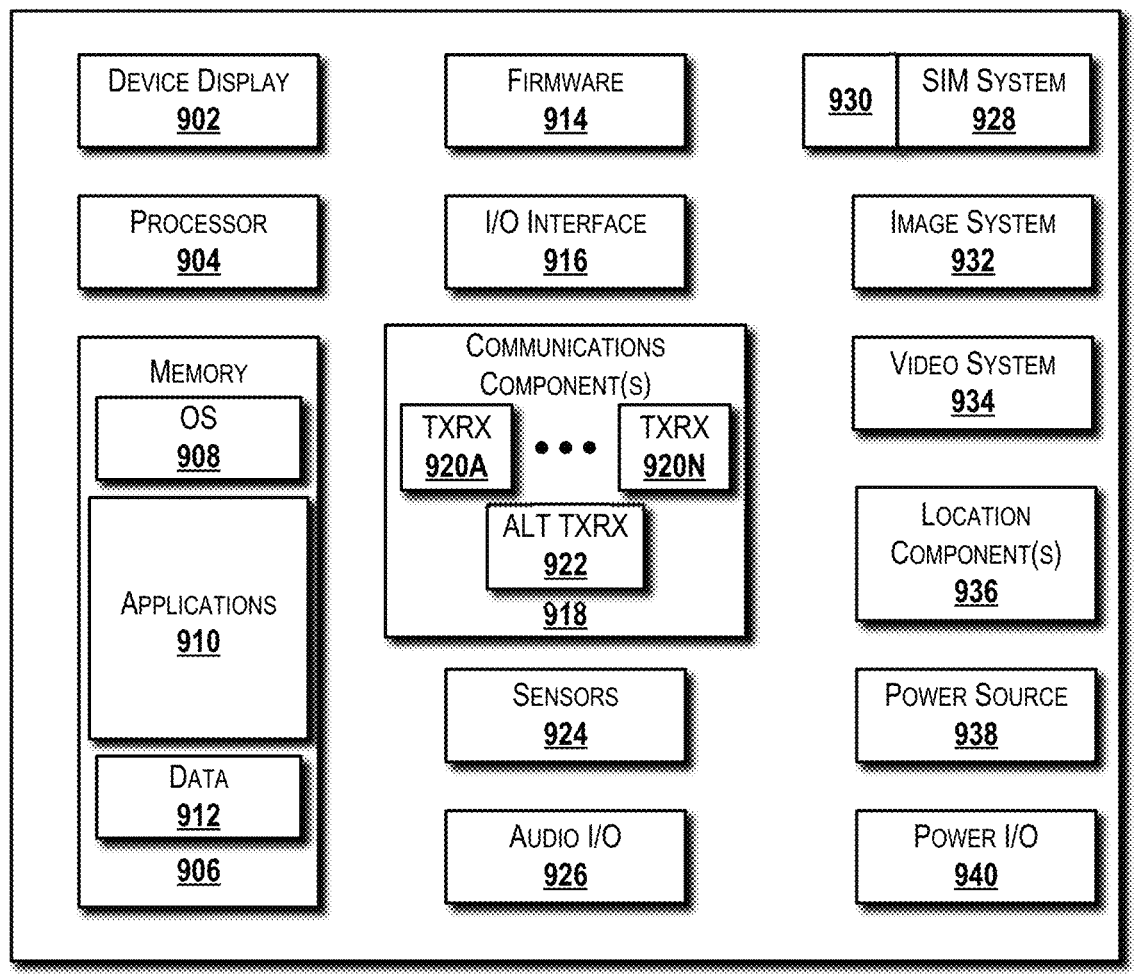
FIG. 9 is a block diagram illustrating an example mobile device, according to some illustrative embodiments.

Turning now to FIG. 9, an illustrative mobile device 900 and components thereof will be described. In some embodiments, the customer device 154 can be configured as and/or can have an architecture similar or identical to the mobile device 900 described herein with respect to FIG. 9. It should be understood, however, that the customer device 154 may or may not include the functionality described herein with reference to FIG. 9. While connections are not shown between the various components illustrated in FIG. 9, it should be understood that some, none, or all of the components illustrated in FIG. 9 can be configured to interact with one other to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a device display 902 for displaying data. According to various embodiments, the device display 902 can be configured to display any information. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910, other computer-executable instructions stored in the memory 906, or the like. In some embodiments, the applications 910 also can include a UI application (not illustrated in FIG. 9).

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in interacting with data. The UI application can be executed by the processor 904 to aid a user in answering/initiating calls, entering/deleting other data, entering and setting user IDs and passwords for device access, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900.

According to various embodiments, the applications 910 can include, for example, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904. The firmware 914 also can store code for execution during device power up and power down operations. It should be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data. In some embodiments, the I/O interface 916 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks, such as the network 138. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using GSM, CDMAONE, CDMA2000, LTE, and various other 2G, 2.5G, 3G, 4G, 5G and greater generation technology standards. Moreover, the communications component 918 may facilitate communications over various channel access methods (which may or may not be used by the aforementioned standards) including, but not limited to, TDMA, FDMA, W-CDMA, OFDM, SDMA, and the like.

In addition, the communications component 918 may facilitate data communications using GPRS, EDGE, the HSPA protocol family including HSDPA, EUL or otherwise termed HSUPA, HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-920N (hereinafter collectively and/or generically referred to as "transceivers 920") are shown in FIG. 9, it should be appreciated that less than two, two, or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, BLE, infrared, infrared data association ("IRDA"), near field communications ("NFC"), other RF technologies, combinations thereof, and the like.

In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. One or more of the sensors 924 can be used to detect movement of the mobile device 900. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, CCDs, combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a specific location of the mobile device 900. According to various embodiments, the location components 936 can send and/or receive signals from GPS devices, A-GPS devices, WI-FI/WIMAX and/or cellular network triangulation data, combinations thereof, and the like. The location component 936 also can be configured to communicate with the communications component 918 to retrieve triangulation data from the network 138 for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Figure 10:
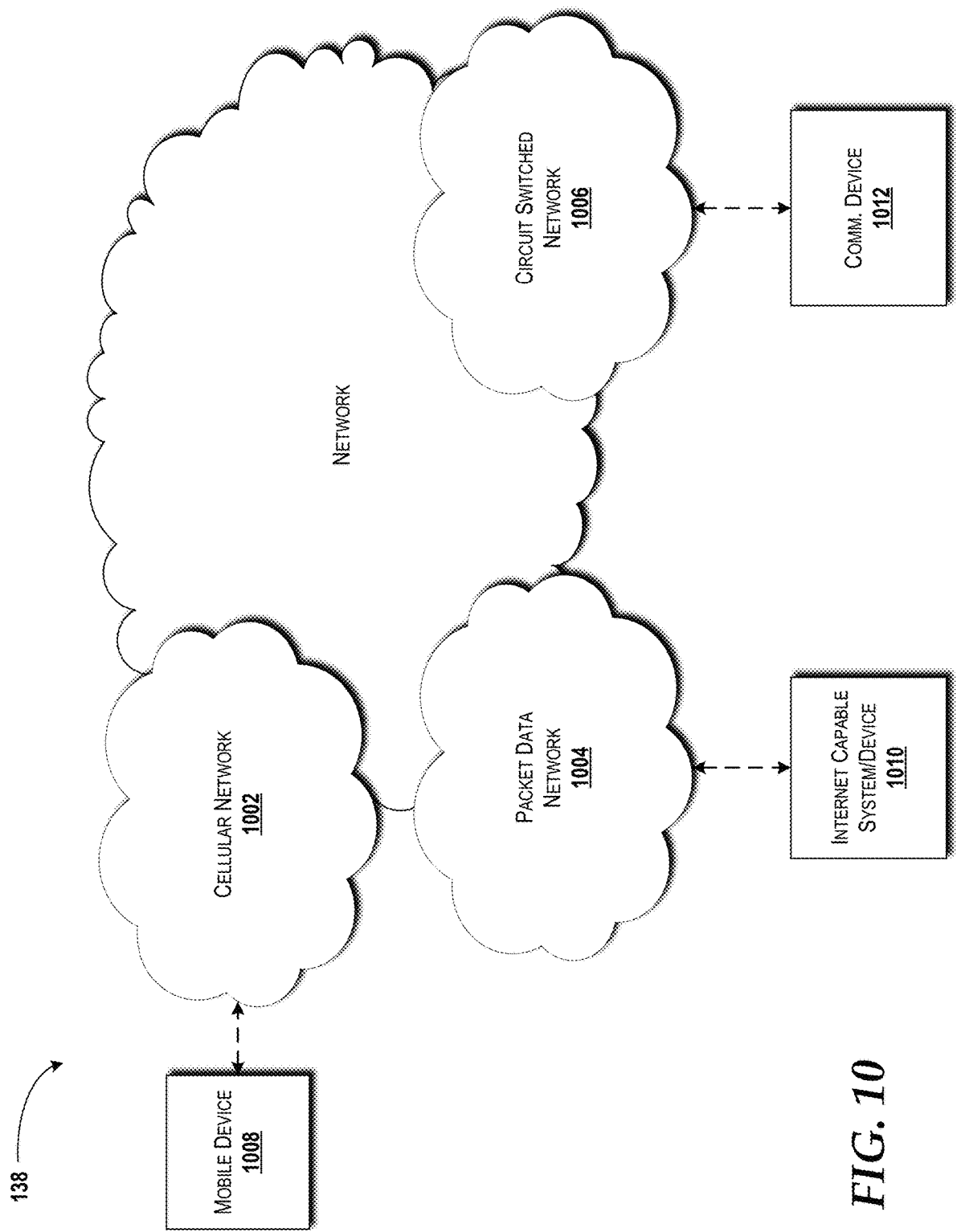
FIG. 10 schematically illustrates a network, according to an illustrative embodiment.

Turning now to FIG. 10, additional details of an embodiment of the network 138 are illustrated, according to an illustrative embodiment. The network 138 includes a cellular network 1002, a packet data network 1004, for example, the Internet, and a circuit switched network 1006, for example, a publicly switched telephone network ("PSTN"). The cellular network 1002 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1002 also includes radios and nodes for receiving and transmitting voice, data, and combinations thereof to and from radio transceivers, networks, the packet data network 1004, and the circuit switched network 1006.

A mobile communications device 1008, such as, for example, the customer device 154, a cellular telephone, a user equipment, a mobile terminal, a PDA, a laptop computer, a handheld computer, and combinations thereof, can be operatively connected to the cellular network 1002. The cellular network 1002 can be configured as a 2G GSM network and can provide data communications via GPRS and/or EDGE. Additionally, or alternatively, the cellular network 1002 can be configured as a 3G UMTS network and can provide data communications via the HSPA protocol family, for example, HSDPA, EUL (also referred to as HSUPA), and HSPA+. The cellular network 1002 also is compatible with 4G mobile communications standards as well as evolved and future mobile standards. In some embodiments, the network 138 can be configured like the cellular network 1002.

The packet data network 1004 can include various devices, for example, the external system(s) 136, servers, computers, databases, and other devices in communication with one another. The packet data network 1004 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1004 includes or is in communication with the Internet.

The circuit switched network 1006 includes various hardware and software for providing circuit switched communications. The circuit switched network 1006 may include, or may be, what is often referred to as a plain old telephone system ("POTS"). The functionality of a circuit switched network 1006 or other circuit-switched network are generally known and will not be described herein in detail.

The illustrated cellular network 1002 is shown in communication with the packet data network 1004 and a circuit switched network 1006, though it should be appreciated that this is not necessarily the case. One or more Internet-capable systems/devices 1010, for example, the external system(s) 136, the customer device 154, the FBC system 102, a personal computer ("PC"), a laptop, a portable device, or another suitable device, can communicate with one or more cellular networks 1002, and devices connected thereto, through the packet data network 1004. It also should be appreciated that the Internet-capable device 1010 can communicate with the packet data network 1004 through the circuit switched network 1006, the cellular network 1002, and/or via other networks (not illustrated).

As illustrated, a communications device 1012, for example, a telephone, facsimile machine, modem, computer, or the like, can be in communication with the circuit switched network 1006, and therethrough to the packet data network 1004 and/or the cellular network 1002. It should be appreciated that the communications device 1012 can be an Internet-capable device, and can be substantially similar to the Internet-capable device 1010. It should be appreciated that substantially all of the functionality described with reference to the network 138 can be performed by the cellular network 1002, the packet data network 1004, and/or the circuit switched network 1006, alone or in combination with additional and/or alternative networks, network elements, and the like.

Figure 11:
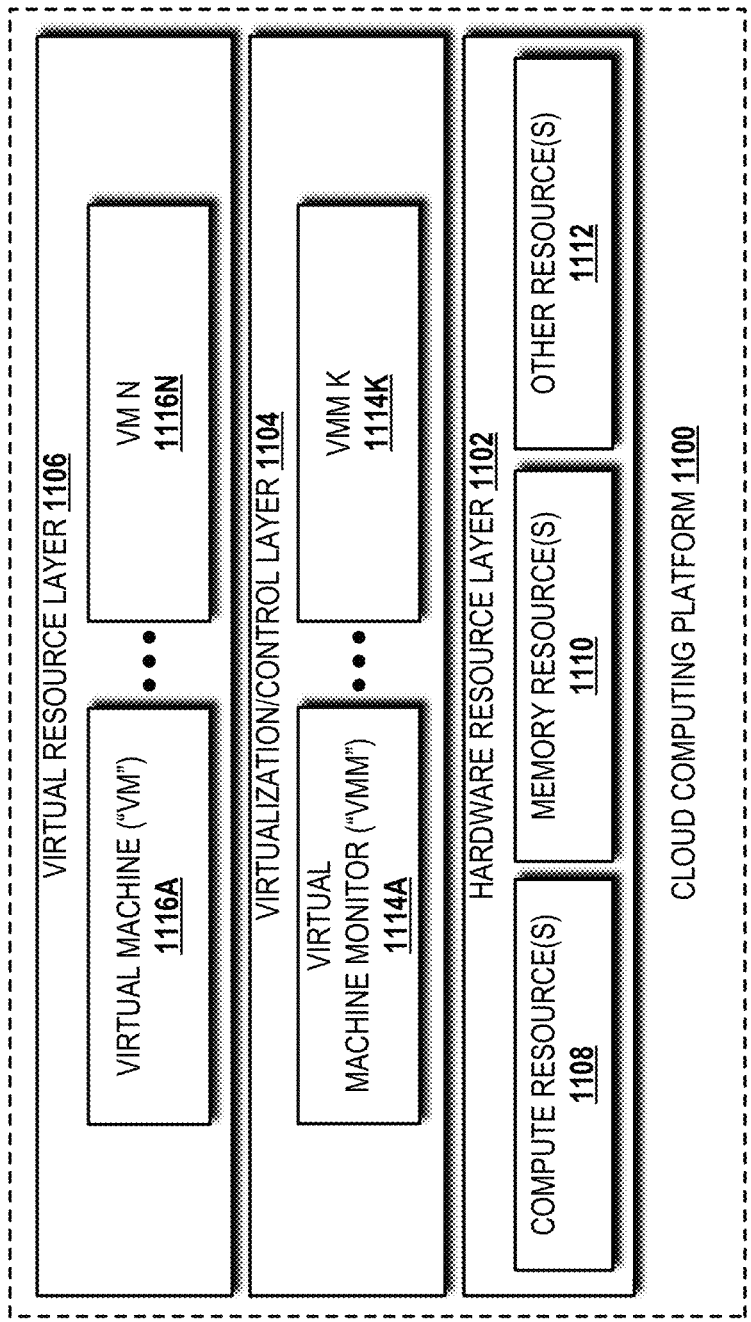
FIG. 11 is a block diagram illustrating a cloud computing platform capable of implementing aspects of the concepts and technologies disclosed herein.

Turning now to FIG. 11, a cloud computing platform 1100 capable of implementing aspects of the concepts and technologies disclosed herein will be described, according to an illustrative embodiment. In some embodiments, the FBC system 102 or parts thereof, the external system(s) 136, and/or the customer device 154 can be implemented, at least in part, on the cloud computing platform 1100. Those skilled in the art will appreciate that the illustrated cloud computing platform 1100 is a simplification of but one possible implementation of an illustrative cloud computing environment, and as such, the cloud computing platform 1100 should not be construed as limiting in any way.

The illustrated cloud computing platform 1100 includes a hardware resource layer 1102, a virtualization/control layer 1104, and a virtual resource layer 1106 that work together to perform operations as will be described in detail herein. While connections are shown between some of the components illustrated in FIG. 11, it should be understood that some, none, or all of the components illustrated in FIG. 11 can be configured to interact with one other to carry out various functions described herein. In some embodiments, the components are arranged so as to communicate via one or more networks (not shown). Thus, it should be understood that FIG. 11 and the following description are intended to provide a general understanding of a suitable environment in which various aspects of embodiments can be implemented, and should not be construed as being limiting in any way.

The hardware resource layer 1102 provides hardware resources, which, in the illustrated embodiment, include one or more compute resources 1108, one or more memory resources 1110, and one or more other resources 1112. The compute resource(s) 1108 can include one or more hardware components that perform computations to process data, and/or to execute computer-executable instructions of one or more application programs, operating systems, and/or other software. The compute resources 1108 can include one or more central processing units ("CPUs") configured with one or more processing cores. The compute resources 1108 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 1108 can include one or more discrete GPUs. In some other embodiments, the compute resources 1108 can include CPU and GPU components that are configured in accordance with a co-processing CPU/GPU computing model, wherein the sequential part of an application executes on the CPU and the computationally-intensive part is accelerated by the GPU. The compute resources 1108 can include one or more system-on-chip ("SoC") components along with one or more other components, including, for example, one or more of the memory resources 1110, and/or one or more of the other resources 1112. In some embodiments, the compute resources 1108 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1108 can be or can include one or more hardware components architected in accordance with an ARM architecture, available for license from ARM HOLDINGS of Cambridge, United Kingdom. Alternatively, the compute resources 1108 can be or can include one or more hardware components architected in accordance with an x86 architecture, such an architecture available from INTEL CORPORATION of Mountain View, Calif., and others. Those skilled in the art will appreciate the implementation of the compute resources 1108 can utilize various computation architectures, and as such, the compute resources 1108 should not be construed as being limited to any particular computation architecture or combination of computation architectures, including those explicitly disclosed herein.

The memory resource(s) 1110 can include one or more hardware components that perform storage operations, including temporary or permanent storage operations. In some embodiments, the memory resource(s) 1110 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1108.

The other resource(s) 1112 can include any other hardware resources that can be utilized by the compute resources (s) 1108 and/or the memory resource(s) 1110 to perform operations described herein. The other resource(s) 1112 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 1102 can be virtualized by one or more virtual machine monitors ("VMMs") 1114A-1114K (also known as "hypervisors;" hereinafter "VMMs 1114") operating within the virtualization/control layer 1104 to manage one or more virtual resources that reside in the virtual resource layer 1106. The VMMs 1114 can be or can include software, firmware, and/or hardware that alone or in combination with other software, firmware, and/or hardware, manages one or more virtual resources operating within the virtual resource layer 1106.

The virtual resources operating within the virtual resource layer 1106 can include abstractions of at least a portion of the compute resources 1108, the memory resources 1110, the other resources 1112, or any combination thereof. These abstractions are referred to herein as virtual machines ("VMs"). In the illustrated embodiment, the virtual resource layer 1106 includes VMs 1116A-1116N (hereinafter "VMs 1116").

Figure 12:
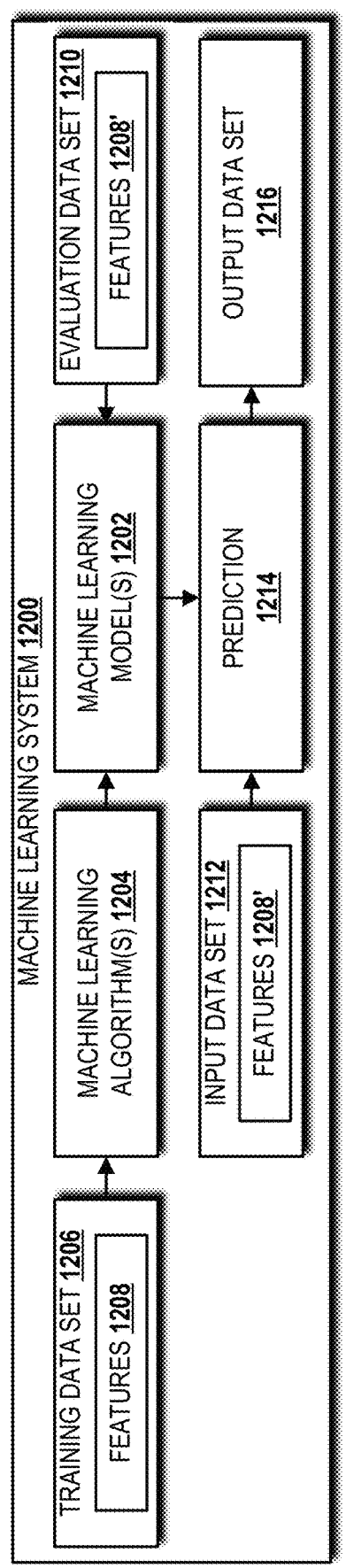
FIG. 12 is a block diagram illustrating a machine learning system capable of implementing aspects of the concept and technologies disclosed herein.

Turning now to FIG. 12, a machine learning system 1200 capable of implementing aspects of the embodiments disclosed herein will be described. In some embodiments, the machine learning system 1200 can be or can include the MLUM 114. The illustrated machine learning system 1200 includes one or more machine learning models 1202, such as one or more trusted digital identity creation models. The machine learning models 1202 can include supervised and/or semi-supervised learning models. The machine learning model(s) 1202 can be created by the machine learning system 1200 based upon one or more machine learning algorithms 1204. The machine learning algorithm(s) 1204 can be any existing, well-known algorithm, any proprietary algorithms, or any future machine learning algorithm. Some example machine learning algorithms 1204 include, but are not limited to, gradient descent, linear regression, logistic regression, linear discriminant analysis, classification tree, regression tree, Naive Bayes, K-nearest neighbor, learning vector quantization, support vector machines, and the like. Classification and regression algorithms might find particular applicability to the concepts and technologies disclosed herein. Those skilled in the art will appreciate the applicability of various machine learning algorithms 1204 based upon the problem(s) to be solved by machine learning via the machine learning system 1200.

The machine learning system 1200 can control the creation of the machine learning models 1202 via one or more training parameters. In some embodiments, the training parameters are selected modelers at the direction of an enterprise, for example. Alternatively, in some embodiments, the training parameters are automatically selected based upon data provided in one or more training data sets 1206. The training parameters can include, for example, a learning rate, a model size, a number of training passes, data shuffling, regularization, and/or other training parameters known to those skilled in the art. The training data in the training data sets 1206 can be collected from the FBC 126 and the other FBCs 612. The training data can include data such as, but not limited to, the data contained in the block(s) 144, the new block(s) 124, and/or the virtual block(s) 142.

The learning rate is a training parameter defined by a constant value. The learning rate affects the speed at which the machine learning algorithm 1204 converges to the optimal weights. The machine learning algorithm 1204 can update the weights for every data example included in the training data set 1206. The size of an update is controlled by the learning rate. A learning rate that is too high might prevent the machine learning algorithm 1204 from converging to the optimal weights. A learning rate that is too low might result in the machine learning algorithm 1204 requiring multiple training passes to converge to the optimal weights.

The model size is regulated by the number of input features ("features") 1208 in the training data set 1206. A greater the number of features 1208 yields a greater number of possible patterns that can be determined from the training data set 1206. The model size should be selected to balance the resources (e.g., compute, memory, storage, etc.) needed for training and the predictive power of the resultant machine learning model 1202.

The number of training passes indicates the number of training passes that the machine learning algorithm 1204 makes over the training data set 1206 during the training process. The number of training passes can be adjusted based, for example, on the size of the training data set 1206, with larger training data sets being exposed to fewer training passes in consideration of time and/or resource utilization. The effectiveness of the resultant machine learning model 1202 can be increased by multiple training passes.

Data shuffling is a training parameter designed to prevent the machine learning algorithm 1204 from reaching false optimal weights due to the order in which data contained in the training data set 1206 is processed. For example, data provided in rows and columns might be analyzed first row, second row, third row, etc., and thus an optimal weight might be obtained well before a full range of data has been considered. By data shuffling, the data contained in the training data set 1206 can be analyzed more thoroughly and mitigate bias in the resultant machine learning model 1202.

Regularization is a training parameter that helps to prevent the machine learning model 1202 from memorizing training data from the training data set 1206. In other words, the machine learning model 1202 fits the training data set 1206, but the predictive performance of the machine learning model 1202 is not acceptable. Regularization helps the machine learning system 1200 avoid this overfitting/memorization problem by adjusting extreme weight values of the features 1208. For example, a feature that has a small weight value relative to the weight values of the other features in the training data set 1206 can be adjusted to zero.

The machine learning system 1200 can determine model accuracy after training by using one or more evaluation data sets 1210 containing the same features 1208' as the features 1208 in the training data set 1206. This also prevents the machine learning model 1202 from simply memorizing the data contained in the training data set 1206. The number of evaluation passes made by the machine learning system 1200 can be regulated by a target model accuracy that, when reached, ends the evaluation process and the machine learning model 1202 is considered ready for deployment.

After deployment, the machine learning model 1202 can perform a prediction operation ("prediction") 1214 with an input data set 1212 having the same features 1208" as the features 1208 in the training data set 1206 and the features 1208' of the evaluation data set 1210. The results of the prediction 1214 are included in an output data set 1216 consisting of predicted data. The machine learning model 1202 can perform other operations, such as regression, classification, and others. As such, the example illustrated in FIG. 12 should not be construed as being limiting in any way.

Based on the foregoing, it should be appreciated that aspects of an FBC framework for permission-based enterprise-focused blockchain applications have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
incorporating, by a chain framework module executed by a processor of a flexible behavioral chain system, a customer value score for a customer into a block of a flexible behavioral chain;
connecting, by the chain framework module, the block to the flexible behavioral chain;
adding, by a normalization engine of a behavioral adjustment module executed by the processor of the flexible behavioral chain system, an analytic trigger probe to the block;
monitoring, by the behavioral adjustment module via the normalization engine, the analytic trigger probe;
determining, by the behavioral adjustment module, based at least in part on an indication determined from the analytic trigger probe, that the customer value score for the customer should be adjusted;
in response to determining that the customer value score for the customer should be adjusted, generating, by a virtual block engine of the behavioral adjustment module, a virtual event, wherein the virtual event triggers a new block request to add a virtual block to the flexible behavioral chain;
in response to the new block request to add a virtual block to the flexible behavioral chain, generating, by the chain framework module, the virtual block; and
connecting, by the chain framework module, the virtual block to the flexible behavioral chain to adjust the customer value score for the customer.

2. The method of claim 1, further comprising determining, by the behavioral adjustment module, whether a lifespan of the virtual block is to be temporary in order to apply a temporary adjustment to the customer value score of the customer or is to be permanent in order to apply a permanent adjustment to the customer value score of the customer.

3. The method of claim 2, further comprising in response to determining that the lifespan of the virtual block is to be temporary, appending temporary timer data to the virtual event that inactivates the virtual block upon an expiration.

4. The method of claim 3, further comprising in response to determining that the lifespan of the virtual block is to be permanent, appending permanent lifespan data to the virtual event.

5. The method of claim 1, further comprising determining, by a customer value score derivation module executed by the processor of the flexible behavioral chain system, the customer value score for the customer.

6. The method of claim 5, wherein the customer value score can be determined based on a customer value score algorithm.

7. The method of claim 6, further comprising:
receiving a customer value score algorithm update; and
updating the customer value score algorithm in accordance with the customer value score algorithm update.

8. A computer-readable storage medium comprising computer-executable instructions comprising a chain framework module, a customer value score derivation module, and a behavioral adjustment module that, when executed by a processor, cause the processor to perform operations comprising:
incorporating, by the chain framework module, a customer value score for a customer into a block of a flexible behavioral chain;
connecting, by the chain framework module, the block to the flexible behavioral chain;
adding, by a normalization engine of the behavioral adjustment module, an analytic trigger probe to the block;
monitoring, by the behavioral adjustment module via the normalization engine, the analytic trigger probe;
determining, by the behavioral adjustment module, based at least in part on an indication determined from the analytic trigger probe, that the customer value score for the customer should be adjusted;
in response to determining that the customer value score for the customer should be adjusted, generating, by a virtual block engine of the behavioral adjustment module, a virtual event, wherein the virtual event triggers a new block request to add a virtual block to the flexible behavioral chain;
in response to the new block request to add a virtual block to the flexible behavioral chain, generating, by the chain framework module, the virtual block; and
connecting, by the chain framework module, the virtual block to the flexible behavioral chain to adjust the customer value score for the customer.

9. The computer-readable storage medium of claim 8, wherein the operations further comprise determining, by the behavioral adjustment module, whether a lifespan of the virtual block is to be temporary in order to apply a temporary adjustment to the customer value score of the customer or is to be permanent in order to apply a permanent adjustment to the customer value score of the customer.

10. The computer-readable storage medium of claim 9, wherein the operations further comprise in response to determining that the lifespan of the virtual block is to be temporary, appending temporary timer data to the virtual event that inactivates the virtual block upon an expiration.

11. The computer-readable storage medium of claim 10, wherein the operations further comprise in response to determining that the lifespan of the virtual block is to be permanent, appending permanent lifespan data to the virtual event.

12. The computer-readable storage medium of claim 8, wherein the operations further comprise determining, by the customer value score derivation module, the customer value score for the customer.

13. The computer-readable storage medium of claim 12, wherein the customer value score can be determined based on a customer value score algorithm.

14. The computer-readable storage medium of claim 13, wherein the operations further comprise:
   receiving a customer value score algorithm update; and
   updating the customer value score algorithm in accordance with the customer value score algorithm update.

15. A flexible behavioral chain system comprising:
   a processor; and
   a memory comprising instructions comprising a chain framework module, a customer value score derivation module, and a behavioral adjustment module that, when executed by the processor, cause the processor to perform operations comprising
      incorporating, by the chain framework module, a customer value score for a customer into a block of a flexible behavioral chain,
      connecting, by the chain framework module, the block to the flexible behavioral chain,
      adding, by a normalization engine of the behavioral adjustment module, an analytic trigger probe to the block,
      monitoring, by the behavioral adjustment module via the normalization engine, the analytic trigger probe,
      determining, by the behavioral adjustment module, based at least in part on an indication determined from the analytic trigger probe, that the customer value score for the customer should be adjusted,
      in response to determining that the customer value score for the customer should be adjusted, generating, by a virtual block engine of the behavioral adjustment module, a virtual event, wherein the virtual event triggers a new block request to add a virtual block to the flexible behavioral chain,
      in response to the new block request to add a virtual block to the flexible behavioral chain, generating, by the chain framework module, the virtual block, and
      connecting, by the chain framework module, the virtual block to the flexible behavioral chain to adjust the customer value score for the customer.

16. The flexible behavioral chain system of claim 15, wherein the operations further comprise determining, by the behavioral adjustment module, whether a lifespan of the virtual block is to be temporary in order to apply a temporary adjustment to the customer value score of the customer or is to be permanent in order to apply a permanent adjustment to the customer value score of the customer.

17. The flexible behavioral chain system of claim 16, wherein the operations further comprise:
   in response to determining that the lifespan of the virtual block is to be temporary, appending temporary timer data to the virtual event that inactivates the virtual block upon an expiration; and
   in response to determining that the lifespan of the virtual block is to be permanent, appending permanent lifespan data to the virtual event.

18. The flexible behavioral chain system of claim 15, wherein the operations further comprise determining, by the customer value score derivation module, the customer value score for the customer.

19. The flexible behavioral chain system of claim 18, wherein the customer value score can be determined based on a customer value score algorithm.

20. The flexible behavioral chain system of claim 19, wherein the operations further comprise:
   receiving a customer value score algorithm update; and
   updating the customer value score algorithm in accordance with the customer value score algorithm update.

\* \* \* \* \*